3,349,137
PROCESS FOR PURIFYING 2,2,2-TRIFLUORO-1-CHLORO-1-BROMOETHANE
Donald Thomas Cropp, Runcorn, and David John Gilman, Macclesfield, England, assignors to Imperial Chemical Industries Limited, London, England, a corporation of Great Britain
No Drawing. Filed Oct. 21, 1965, Ser. No. 500,153
Claims priority, application Great Britain, Oct. 28, 1964, 43,979/64
7 Claims. (Cl. 260—653)

ABSTRACT OF THE DISCLOSURE

A process is disclosed for purifying impure 2,2,2-trifluoro-1-chloro-1-bromoethane by contacting the same in the liquid phase with aluminum chloride, aluminum bromide or antimony pentachloride followed by separating the 2,2,2-trifluoro-1-chloro-1-bromoethane from the resulting mixture.

---

This invention relates to a purification process and more particularly it relates to a process for the purification of 2,2,2-trifluoro-1-chloro-1-bromoethane hereinafter referred to as halothane.

Halothane is a valuable inhalation anaesthetic used for the production of anaesthesia in man and in animals. However, depending on the manner of manufacture of halothane, it may contain small amounts of certain impurities and it is an object of the present invention to remove such impurities.

According to the present invention we provide a process for the purification of impure halothane containing as impurity one or more compounds of the formula:

$$CF_3.CX=CY.CF_3$$

wherein X stands for hydrogen, bromine or chlorine and Y stands for bromine or chlorine which comprises intimately contacting said impure halothane in the liquid phase with aluminium chloride, aluminium bromide or antimony pentachloride and recovering the purified halothane.

It is to be understood that any compound of the above stated formula may be present as impurity in the form of a cis isomer or a trans isomer or a mixture thereof.

The process of the invention may be carried out by adding granular or powdered aluminium bromide, aluminium chloride or liquid antimony pentachloride to the impure halothane and stirring the mixture at a temperature ranging from about 0° C. to the boiling point of the mixture. Alternatively aluminium bromide can be generated in situ by adding aluminium powder to said impure halothane which also contains bromine. Longer times of contact are required with lower temperatures in this range and it is preferable to carry out this process at ambient temperature or above.

Since aluminium bromide and aluminium chloride are affected by exposure to the atmosphere, we prefer to grind the said bromide or chloride under the surface of the impure halothane and then to stir the mixture.

The amount of aluminium chloride, aluminium bromide or antimony pentachloride used depends upon the concentration of impurity in the halothane. It is preferable to use an excess of aluminium chloride, aluminium bromide or antimony pentachloride relative to the impurity and good results are obtained by use of 10 to 100 molar proportions of aluminum halide per mole of the impurity.

The present process may be carried out in a batchwise or continuous manner.

The halothane may be recovered from the reaction mixture by any suitable means. It may be recovered for example by distillation from the reaction mixture. Alternatively, the excess aluminium chloride or aluminium bromide may be removed either by filtration or by dissolving in an acid or alkaline aqueous medium. If filtration is used, the halothane may then be recovered by washing the filtrate with aqueous sodium hydroxide and the organic phase containing halothane is then dried and distilled. If dissolution in an acid or alkaline aqueous medium is used, the halothane may then be recovered from the organic phase after washing, drying and distilling operations.

The following examples illustrate but do not limit the invention. All parts and percentages are to be read as parts by weight.

Example 1

Into a stirred glass vessel were added continuously at 15–18° C., 3720 parts per hour of impure halothane and 54 parts per hour of aluminium bromide (contact time 20 seconds). The halothane originally contained approximately 500 p.p.m. of 1,1,1,4,4,4-hexafluoro-2-bromobutene-2 (mainly trans isomer), approximately 800 p.p.m. of 1,1,1,4,4,4-hexafluoro-2-chlorobutene-2 (mainly trans isomer) and a small amount of hydrogen bromide and bromine.

The mixture was withdrawn continuously and washed with a 7% aqeous caustic soda solution. The final mixture separated into two phases and the lower phase containing the halothane was distilled. The distilled material on analysis by gas/liquid chromatography was found to contain less than 10 p.p.m. total of the impurities.

Example 2

1870 parts of halothane to which had been added 1,1,1,4,4,4-hexafluoro-2,3-dichlorobutene-2 (cis and trans isomers) to give a content of 1000 p.p.m. of the impurity were stirred with 100 parts of aluminium bromide at 15–18° C. for 16 hours. After separation of the halothane, the impurity could not be detected by gas/liquid chromatographic analysis.

Example 3

1702 parts of halothane containing as impurities 27 p.p.m. of 1,1,1,4,4,4-hexafluoro-2,3-dichlorobutene-2 (cis and trans isomers) and 186 p.p.m. of 1,1,1,4,4,4-hexafluoro-2-bromobutene-2 (trans isomer) were heated with stirring at reflux temperature with 17 parts of aluminium bromide for 2 hours.

Halothane was then removed by distillation at normal pressure and the distillate was washed with 500 parts water, then with 100 parts of a 5% aqueous solution of potassium bisulphite and finally with 500 parts of water. The organic layer was separated and dried over calcium chloride. Gas/liquid chromatographic analysis of the dried liquid showed the level of impurities to be <1 p.p.m. of 1,1,1,4,4,4-hexafluoro-2,3-dichlorobutene-2 and <1 p.p.m. of 1,1,1,4,4,4-hexafluoro-2-bromobutene-2.

Example 4

100 parts halothane containing 372 p.p.m. of 1,1,1,4,4,4-hexafluoro-2,3-dichlorobutene-2 as impurity were stirred with 23 parts of antimony pentachloride at 15–18° C. for 28 hours. After recovery of the halothane, the impurity could not be detected by gas/liquid chromatographic analysis.

Example 5

374 parts halothane containing 390 p.p.m. 1,1,1,4,4,4-hexafluoro-2-bromobutene-2 (trans isomer) were heated with stirring at reflux temperature with 0.5 part of aluminium bromide for 30 minutes. Successive 0.5 part amounts of aluminium bromide were added at half hourly intervals over a further period of 1½ hours and the mixture heated under reflux for a further 30 minutes following the last addition of aluminium bromide. After recovery of halothane gas/liquid chromatographic examination showed that the content of the impurity was <20 p.p.m.

*Example 6*

Under 100 parts halothane containing 200 p.p.m. of 1,1,1,4,4,4-hexafluoro-2-bromobutene-2 (trans isomer) and 200 p.p.m. of 1,1,1,4,4,4-hexafluoro-2-chlorobutene-2 (trans isomer) were ground 2 parts of granular aluminium chloride. The mixture was stirred at 15–18° C. At intervals, specimens of the material were withdrawn and after washing with aqueous 7% sodium hydroxide were submitted to gas/liquid chromatographic analysis.

After 30 minutes' stirring the halothane was found to contain <10 p.p.m. of 1,1,1,4,4,4-hexafluoro-2-bromobutene-2 and after 1 hour's stirring, it was found to contain <10 p.p.m. of 1,1,1,4,4,4-hexafluoro-2-chlorobutene-2.

What we claim is:

1. A process for the purification of impure 2,2,2-trifluoro-1-chloro-1-bromoethane containing as impurity a small amount of one or more of the compounds of the formula: —CF$_3$CX=CYCF$_3$ wherein X stands for hydrogen, bromine or chlorine and Y stands for bromine or chlorine which comprises intimately contacting said impure 2,2,2-trifluoro-1-chloro-1-bromoethane in the liquid phase with a halide selected from the group consisting of aluminium chloride, aluminium bromide and antimony pentachloride and then separating the 2,2,2-trifluoro-1-chloro-1-bromoethane from the resulting mixture, the impurity being retained by said halide.

2. A process as claimed in claim 1 wherein granular or powder aluminium bromide or aluminium chloride or liquid antimony pentachloride is added to the impure 2,2,2-trifluoro-1-chloro-1-bromoethane and the mixture is stirred at a temperature reading from 0° C. to the boiling point of the mixture.

3. A process as claimed in claim 2 in which the added aluminium bromide or chloride is ground under the surface of the impure 2,2,2-trifluoro-1-chloro-1-bromoethane and the mixture is then stirred.

4. A process as claimed in claim 1 in which the aluminium bromide is generated in situ by adding aluminium powder to impure 2,2,2-trifluoro-1-chloro-1-bromoethane which also contains bromine.

5. A process as claimed in claim 2 in which the mixture is stirred at at least ambient temperature.

6. A process as claimed in claim 2 in which an excess of aluminium chloride, aluminium bromide or antimony pentachloride relative to the impurity is employed.

7. A process as claimed in claim 6 in which 10 to 100 molar proportions of aluminium halide are employed per mole of the impurity.

References Cited

FOREIGN PATENTS 1,041,937  10/1958  Germany.

DANIEL D. HORWITZ, *Primary Examiner.*